(12) United States Patent
Koseoglu et al.

(10) Patent No.: US 8,790,508 B2
(45) Date of Patent: Jul. 29, 2014

(54) INTEGRATED DEASPHALTING AND OXIDATIVE REMOVAL OF HETEROATOM HYDROCARBON COMPOUNDS FROM LIQUID HYDROCARBON FEEDSTOCKS

(75) Inventors: Omer Refa Koseoglu, Dhahran (SA); Abdennour Bourane, Ras Tanura (SA)

(73) Assignee: Saudi Arabian Oil Company, Dhahran (SA)

(*) Notice: Subject to any disclaimer, the term of this patent is extended or adjusted under 35 U.S.C. 154(b) by 523 days.

(21) Appl. No.: 12/893,367

(22) Filed: Sep. 29, 2010

(65) Prior Publication Data

US 2012/0074040 A1 Mar. 29, 2012

(51) Int. Cl.
*C10G 53/00* (2006.01)
*C10G 53/16* (2006.01)
*C10G 29/00* (2006.01)
*C10G 29/20* (2006.01)
*C01G 27/00* (2006.01)
*C01G 27/04* (2006.01)

(52) U.S. Cl.
USPC .......... 208/78; 208/309; 208/208 R; 208/240; 208/291; 208/299

(58) Field of Classification Search
USPC .......... 208/45, 208 R, 46, 78, 177, 240, 290, 208/291, 299, 309
See application file for complete search history.

(56) References Cited

U.S. PATENT DOCUMENTS

| | | |
|---|---|---|
| 3,236,883 A | 2/1966 | Franz |
| 3,278,562 A | 10/1966 | Thigpen et al. |
| 3,551,328 A | 12/1970 | Wilson et al. |
| 3,719,589 A | 3/1973 | Herbstman et al. |
| 3,775,295 A | 11/1973 | Watkins |
| 3,859,199 A | 1/1975 | Gatsis |
| 4,097,364 A | 6/1978 | Egan |
| 4,097,520 A | 6/1978 | Slattery |
| 4,113,661 A | 9/1978 | Tamm |
| 4,239,616 A | 12/1980 | Gearhart |
| 4,290,880 A | 9/1981 | Leonard |
| 4,305,814 A | 12/1981 | Leonard |
| 4,411,790 A | 10/1983 | Arod |
| 4,430,203 A | 2/1984 | Cash |
| 4,437,980 A | 3/1984 | Heredy et al. |
| 4,482,453 A | 11/1984 | Coombs et al. |
| 4,502,944 A | 3/1985 | Nelson |

(Continued)

FOREIGN PATENT DOCUMENTS

| | | |
|---|---|---|
| EP | 1674158 A1 | 6/2006 |
| WO | 02074884 A1 | 9/2002 |

(Continued)

OTHER PUBLICATIONS

Niccum, et al., Processing Heavy Ends: Part 1, 2008, Kellogg, Brown, & Root, pp. 92-98.*

(Continued)

*Primary Examiner* — Walter D Griffin
*Assistant Examiner* — Derek Mueller
(74) *Attorney, Agent, or Firm* — Abelman, Frayne & Schwab

(57) ABSTRACT

A system and process are provided for integrated deasphalting and desulfurization of hydrocarbon feedstock in which the hydrocarbon feedstock, an oxidant, and an oxidation catalyst are mixed prior to passage into a primary settler of a solvent deasphalting unit. Oxidation products, including oxidized organosulfur compounds, are discharged with the asphalt phase.

17 Claims, 1 Drawing Sheet

(56) References Cited

U.S. PATENT DOCUMENTS

| | | | |
|---|---|---|---|
| 4,572,781 A | 2/1986 | Krasuk et al. | |
| 4,639,308 A | 1/1987 | Lee | |
| 4,663,028 A | 5/1987 | Ditman | |
| 4,715,946 A * | 12/1987 | Le Page et al. | 208/45 |
| 4,747,936 A | 5/1988 | Penning | |
| 4,757,042 A | 7/1988 | Threlkel | |
| 4,810,367 A | 3/1989 | Chombart et al. | |
| 4,816,140 A | 3/1989 | Trambouze et al. | |
| 4,976,848 A | 12/1990 | Johnson | |
| 4,990,243 A | 2/1991 | Winslow et al. | |
| 5,024,750 A | 6/1991 | Sughrue, II et al. | |
| 5,059,304 A | 10/1991 | Field | |
| 5,071,805 A | 12/1991 | Winslow et al. | |
| 5,190,642 A | 3/1993 | Wilson et al. | |
| 5,294,332 A | 3/1994 | Klotz | |
| 5,324,417 A | 6/1994 | Harandi | |
| 5,529,930 A | 6/1996 | Monticello et al. | |
| 5,656,152 A | 8/1997 | McLaughlin et al. | |
| 5,770,761 A | 6/1998 | Lin et al. | |
| 5,961,821 A | 10/1999 | Varadaraj et al. | |
| 6,160,193 A | 12/2000 | Gore | |
| 6,171,478 B1 | 1/2001 | Cabrera et al. | |
| 6,180,557 B1 | 1/2001 | Choudhary et al. | |
| 6,241,874 B1 | 6/2001 | Wallace et al. | |
| 6,274,785 B1 | 8/2001 | Gore | |
| 6,277,271 B1 | 8/2001 | Kocal | |
| 6,402,940 B1 | 6/2002 | Rappas | |
| 6,406,616 B1 | 6/2002 | Rappas et al. | |
| 6,409,912 B1 | 6/2002 | Wallace et al. | |
| 6,596,914 B2 | 7/2003 | Gore et al. | |
| 6,673,235 B2 | 1/2004 | Harris et al. | |
| 2002/0035306 A1 | 3/2002 | Gore et al. | |
| 2003/0094400 A1 | 5/2003 | Levy et al. | |
| 2004/0178122 A1 | 9/2004 | Karas et al. | |
| 2005/0218038 A1 | 10/2005 | Nero et al. | |
| 2006/0091045 A1 | 5/2006 | Figueras et al. | |
| 2006/0108263 A1 | 5/2006 | Lin et al. | |
| 2006/0131214 A1 | 6/2006 | De Souza et al. | |
| 2006/0272983 A1 | 12/2006 | Droughton et al. | |
| 2007/0151901 A1 | 7/2007 | Sain et al. | |
| 2007/0267327 A1 | 11/2007 | Boakye | |

FOREIGN PATENT DOCUMENTS

| | | |
|---|---|---|
| WO | 03014266 A1 | 2/2003 |
| WO | 2005012458 A1 | 2/2005 |
| WO | 2006071793 A1 | 7/2006 |
| WO | 2007103440 A2 | 9/2007 |
| WO | 2007106943 A1 | 9/2007 |

OTHER PUBLICATIONS

International Search Report and Written Opinion, PCT/US2011/050990 dated Jan. 25, 2012 (6 pp.).

Zachgo Kelly et al., "Rose—A Flexible Process for Upgrading Heavy Crude, Atmospheric Residue, or Vacuum Residue." Proceedings from the 6th UNITAR Conference on Heavy Crude and Tar Sands, 1995, pp. 245-252.

Ishihara Atsushi et al., "Oxidative desulfurization and denitrogenation of a light gas oil using an oxidation/adsorption continuous flow process." Applied Catalysis A: General 279, 2005, pp. 279-287.

* cited by examiner

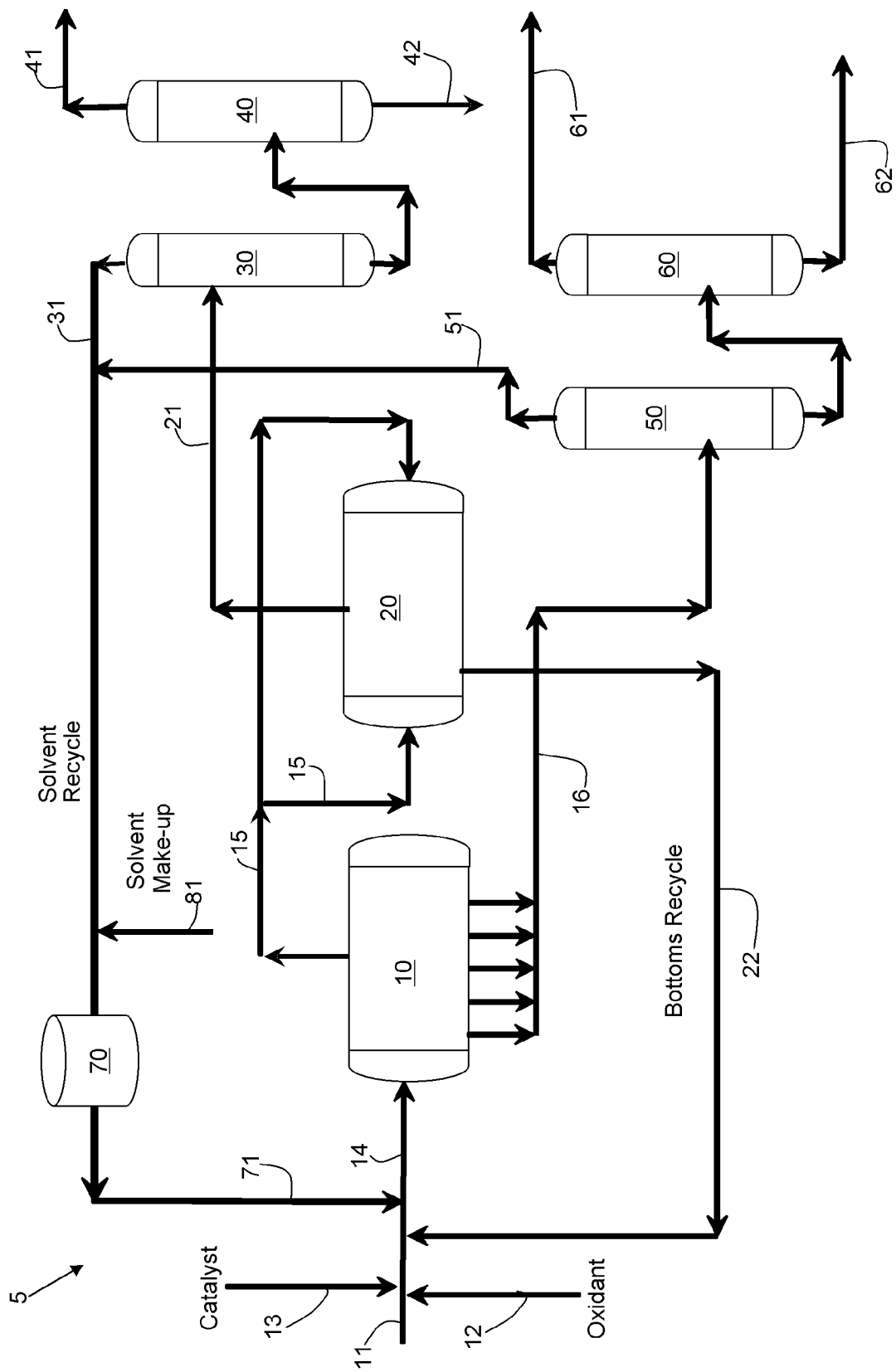

INTEGRATED DEASPHALTING AND OXIDATIVE REMOVAL OF HETEROATOM HYDROCARBON COMPOUNDS FROM LIQUID HYDROCARBON FEEDSTOCKS

RELATED APPLICATIONS

Not applicable.

BACKGROUND OF THE INVENTION

1. Field of the Invention

This invention relates to oxidative desulfurization and more particularly to a process for integrated deasphalting and oxidative removal of heteroatom-containing hydrocarbon compounds, such as organosulfur compounds, of liquid hydrocarbon feedstocks.

2. Description of Related Art

In conventional oil refinery operations, various processes occur in discrete units and/or steps. This is generally due to the complexity of naturally occurring whole crude oil mixtures, and the fact that crude oil feedstocks processed at refineries often differ based on the location and age of the production well, pre-processing activities at the production well, and the means used to transport the crude oil from the well to the refinery plant. Two very important and conventionally separate preliminary refining processes include removal of heteroatom-containing hydrocarbon compounds, such as desulfurization to reduce the organosulfur compounds present, and solvent deasphalting to separate the relatively heavy asphaltenic materials from a lighter deasphalted and demetalized phase. The deasphalted/demetalized phase is further refined into various petroleum products including transportation fuels.

Whole crude oil commonly contains organosulfur compounds and heteroatom compounds such as those containing nitrogen. These compounds are generally undesirable and must be removed at one or more stages during refinery operations. Light crude oil has a sulfur content as low as 0.01 weight %. In contrast, heavy crude oil can contain up to about 3 weight % sulfur. Similarly, the nitrogen content of crude oil is in the range of 0.001-1.0 weight %. The heteroatom and carbon residue (measured as Ramsbottom carbon residue, or RCR) content of various Saudi Arabian crude oils are given in Table 1, where "ASL" refers to Arab Super Light, "AEL" refers to Arab Extra Light, "AL" refers to Arab Light, "AM" refers to Arab Medium and "AH" refers to Arab Heavy.

TABLE 1

| Property | ASL | AEL | AL | AM | AH |
|---|---|---|---|---|---|
| Gravity, ° | 51.4 | 39.5 | 33.0 | 31.1 | 27.6 |
| Sulfur, W % | 0.05 | 1.07 | 1.83 | 2.42 | 2.94 |
| Nitrogen, ppmw | 70 | 446 | 1064 | 1417 | 1651 |
| RCR, W % | 0.51 | 1.72 | 3.87 | 5.27 | 7.62 |
| Ni + V, ppmw | <0.1 | 2.9 | 21 | 34.0 | 67 |

The heteroatom content of crude oil generally increases with decreasing API gravity, or increasing heaviness, as is apparent from Table 1. The heteroatom content of crude oil fractions also increases in higher boiling fractions, as shown in Table 2:

TABLE 2

| Fractions, ° C. | Sulfur WT % | Nitrogen ppmw |
|---|---|---|
| C5-90 | 0.01 | — |
| 93-160 | 0.03 | — |
| 160-204 | 0.06 | — |
| 204-260 | 0.34 | — |
| 260-315 | 1.11 | — |
| 315-370 | 2.00 | 253 |
| 370-430 | 2.06 | 412 |
| 430-482 | 2.65 | 848 |
| 482-570 | 3.09 | 1337 |

In a typical refinery, crude oil is first fractionated in an atmospheric distillation column to separate tops including sour gas, e.g., hydrogen sulfide, and light hydrocarbons such as methane, ethane, propane, and butanes. Naphtha (36-180° C.), kerosene (180-240° C.), and gas oil (240-370° C.) are typically recovered as sidestreams from the distillation column. Atmospheric residue, which is the hydrocarbon fractions boiling above 370° C., is discharged as bottoms. The atmospheric residue from the atmospheric distillation column is either used as fuel oil or sent to a vacuum distillation unit, depending on the configuration of the refinery. Main products from the vacuum distillation unit include vacuum gas oil, having hydrocarbons boiling in the range of 370-520° C., and vacuum residue, encompassing hydrocarbons boiling above 520° C.

As the boiling point of the petroleum fractions increases, the quality of oil decreases and thus negatively impacts the downstream processing units. Tables 3 provide quality of atmospheric residue (boiling above 370° C.) and Table 4 provides quality of vacuum residue (boiling above 520° C.) derived from various crude sources:

TABLE 3

| Source | Name | API Gravity, ° | Sulfur, W % | Ni + V, ppmw | CCR, W % |
|---|---|---|---|---|---|
| Middle East | Arabian Light | 16.80 | 3.14 | 550.00 | 7.60 |
| Middle East | Arabian Heavy | 12.70 | 4.30 | 125.00 | 13.20 |
| South Asia | Munis | 26.40 | 0.15 | 16.00 | 4.20 |
| South Asia | Duri | 17.50 | 0.22 | 17.00 | 9.30 |
| China | Shengli | 18.70 | 1.23 | 19.00 | 8.60 |
| China | Taching | 25.10 | 0.13 | 4.00 | 4.00 |
| Latin America | Maya | 8.30 | 4.82 | 494.00 | 17.40 |
| Latin America | Ithmus | 13.90 | 2.96 | 53.00 | 8.20 |
| North America | Cold Lake | 6.68 | 5.05 | 325.00 | 18.30 |

TABLE 4

| Source | Name | API Gravity, ° | Sulfur, W % | Ni + V, ppmw | CCR, W % |
|---|---|---|---|---|---|
| Middle East | Arabian Light | 6.90 | 4.34 | 141.00 | 20.30 |
| Middle East | Arabian Heavy | 3.00 | 6.00 | 269.00 | 27.70 |
| South Asia | Munis | 17.30 | 0.19 | 44.00 | 10.40 |
| South Asia | Duri | 13.00 | 0.25 | 32.00 | 15.20 |
| China | Shengli | 11.70 | 1.66 | 28.00 | 16.40 |
| China | Taching | 18.70 | 0.18 | 9.00 | 9.50 |
| Latin America | Maya | −0.10 | 5.98 | 835.00 | 29.60 |
| Latin America | Ithmus | 4.00 | 4.09 | 143.00 | 21.10 |
| Middle East | Kirkuk | 11.71 | 5.14 | 189.00 | 18.20 |

Tables 3 and 4 clearly indicate that the atmospheric or vacuum residues are highly contaminated with heteroatoms and have high Conradson carbon residue (CCR) content. In addition, Tables 3 and 4 show that the quality of the hydrocarbon deteriorates with increasing boiling point.

Naphtha, kerosene and gas oil streams from crude oils or other natural sources such as shale oils, bitumens and tar sands, are conventionally treated to remove contaminants, mainly sulfur, the quantity of which exceeds the allowable specifications. Hydrotreating is the most common technology to remove these contaminants. Vacuum gas oil is processed in a hydrocracking unit to produce gasoline and diesel or in a fluid catalytic cracking unit to produce mainly gasoline, light cycle oil (LCO) and heavy cycle oil (HCO) as by-products. LCO is typically either used as a blending component in a diesel pool or fuel oil, and HCO is generally sent directly to a fuel oil pool. There are several processing options for the vacuum residue fraction, including hydroprocessing, coking, visbreaking, gasification and solvent deasphalting.

Contaminants such as sulfur, nitrogen, and poly-nuclear aromatics in the crude oil fractions impact the downstream processes including hydrotreating, hydrocracking and FCC. The contaminants are present in the crude oil fractions in varying structures and concentrations.

Solvent deasphalting processes are well know art and practiced worldwide. Solvent deasphalting is a separation process in which residue is separated by solubility, instead of by boiling point as in vacuum distillation processes. In general, solvent deasphalting processes produce a low-contaminant deasphalted oil (DAO) rich in paraffinic type molecules. These fractions can then be further processed in conventional conversion units such as an FCC unit or a hydrocracking unit. Solvent deasphalting is usually carried out with paraffin streams having a carbon number ranging from 3-7, preferably 4-5, at or below the critical conditions of the solvent. Table 5 lists key properties of common solvents used in solvent deasphalting.

TABLE 5

| Name | Formula | MW (g/g-mol) | Boiling Point (° C.) | Specific Gravity | Critical Temperature (° C.) | Critical Pressure (bar) |
|---|---|---|---|---|---|---|
| propane | C3H8 | 44.1 | −42.1 | 0.508 | 96.8 | 42.5 |
| n-butane | C4H10 | 58.1 | −0.5 | 0.585 | 152.1 | 37.9 |
| i--butane | C4H10 | 58.1 | −11.7 | 0.563 | 135.0 | 36.5 |
| n-pentane | C5H12 | 72.2 | 36.1 | 0.631 | 196.7 | 33.8 |
| i--pentane | C5H12 | 72.2 | 27.9 | 0.625 | 187.3 | 33.8 |

The feed is mixed with the solvent so that the deasphalted oil is solubilized in the solvent. The insoluble pitch precipitates out of the mixed solution. Separation of the DAO phase (solvent-DAO mixture) and the pitch phase typically occurs in an extractor designed to efficiently separate the two phases and minimize contaminant entrainment in the DAO phase.

The DAO phase is then heated to conditions at which the solvent becomes supercritical. Under these conditions, the separation of the solvent and DAO is relatively easy in a DAO separator. Any entrained solvent in the DAO phase and the pitch phase is stripped out, typically with a low pressure steam stripping apparatus. Recovered solvent is condensed and combined with solvent recovered under high pressure from the DAO separator. The solvent is then recycled back to be mixed with the feed.

Solvent deasphalting is carried-out in liquid phase thus the temperature and pressure are set accordingly. There are generally two stages for phase separation in solvent deasphalting. In a first separation stage, the temperature is maintained at a lower level than the temperature in the second stage to separate the bulk of the asphaltenes. The second stage temperature is carefully selected to control the final deasphalted/demetalized oil quality and quantity. Excessive temperature levels will result in a decrease in deasphalted/demetalized oil yield, but the deasphalted/demetalized oil will be lighter, less viscous, and contain less metals, asphaltenes, sulfur, and nitrogen. Insufficient temperature levels has the opposite effect such that the deasphalted/demetalized yield decreases but the product quality is higher.

Operating conditions for solvent deasphalting units are generally based on a specific solvent and charge stock to produce a deasphalted/demetalized oil of a specified yield and quality. Therefore, the extraction temperature is essentially fixed for a given solvent, and only small adjustments are typically made to maintain the deasphalted/demetalized oil quality. Large variations in temperature should be avoided as the resulting solubility change can severely upset the operation. This is especially true at temperatures near the critical temperature of the solvent in which solubility is more sensitive to temperature.

The composition of the solvent is also an important process variable. The solubility of the solvent increases with increasing critical temperature, such that C3<iC4<nC4<iC5, i.e., the solubility of iC5 is greater than that of nC4, which is greater than that of iC4, is greater than that of C3. An increase in critical temperature of the solvent increases the deasphalted/demetalized oil yield. However, solvents having higher critical temperatures afford less selectivity resulting in lower deasphalted/demetalized oil quality.

Solvent deasphalting units are operated at pressures that are high enough to maintain the solvent in the liquid phase, and is not considered a process variable and thus should not be changed unless changes are made on the solvent composition.

The volumetric ratio of the solvent to the solvent deasphalting unit charge is also important in its impact on selectivity, and to a lesser degree, on the deasphalted/demetalized oil yield. The major effect of the solvent-to-oil ratio is that a higher ratio results in a higher quality of the deasphalted/demetalized oil for a fixed deasphalted/demetalized yield. A high solvent-to-oil ratio is preferred because of better selectivity, but increased operating costs conventionally dictate that ratios be limited to a relatively narrow range. Selection of the solvent is also a factor in establishing operational solvent-to-oil ratios. The necessary solvent-to-oil ratio decreases as the critical solvent temperature increases. The solvent-to-oil ratio is, therefore, a function of desired selectivity, operation costs and solvent selection.

It is difficult to generalize the impact of feed composition because of the many variables involved. The API, the characterization factor (known as the "k" factor established by UOP, LLC of Des Plaines, Ill., USA), the asphaltenes content, the Conradson carbon content, the metals content, the nitrogen content, and the sulfur content all influence the quantity and quality of deasphalted/demetalized oil produced. In general, heavier feed results in lower quality of deasphalted/demetalized oil for a given deasphalted/demetalized oil yield. The feed composition is expected to be within a specified design range, and any small changes in feed composition can be compensated for by variation in the extraction temperature. Major changes in feed, such as use of crude of a different type or from a different source, typically require variations in operating conditions and/or different solvent selection.

The pitch product contains a majority of the contaminants from the charge, i.e., metals, asphaltenes, Conradson carbon, and is also rich in aromatic compounds. A three-product unit, in which resin, DAO and pitch can be recovered, is also available. This design allows for a range of bitumens to be manufactured from various resin/pitch blends.

Additional description related to solvent deasphalting units is well know, for instance, as described in U.S. Pat. Nos. 4,816,140, 4,810,367, 4,747,936, 4,572,781, 4,502,944, 4,411,790, 4,239,616, 4,305,814, 4,290,880, 4,482,453, and 4,663,028, all of which are incorporated by reference herein.

As mentioned above, sulfur is a contaminant that must be substantially removed at some point in the refinery operation. The discharge into the atmosphere of sulfur compounds during processing and end-use of the petroleum products derived from sulfur-containing sour crude oil pose health and environmental problems. Stringent reduced-sulfur specifications applicable to transportation and other fuel products have impacted the refining industry, and it is necessary for refiners to make capital investments to greatly reduce the sulfur content in gas oils to 10 parts per million by weight (ppmw) or less. In the industrialized nations such as the United States, Japan and the countries of the European Union, transportation fuel refineries have already been required to produce an environmentally clean product. For instance, in 2007 the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the footsteps of the United States and the European Union and are moving forward with regulations that will require refineries to produce transportation fuels with an ultra-low sulfur level.

Accordingly, impurities such as sulfur, nitrogen and other heteroatoms must be removed prior to or during refining to meet the environmental regulations for the final products (e.g., gasoline, diesel, fuel oil) or for the intermediate refining streams that are to be further upgraded, such by reforming isomerization.

To keep pace with recent trends toward production of ultra-low sulfur fuels, refiners must choose among processes or crude oil sources that ensure future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters, represent a substantial prior investment and were constructed before these more stringent sulfur reduction requirements were enacted. It is very difficult to upgrade existing hydrotreating reactors in these facilities because of the comparatively more severe operational requirements (i.e., higher temperature and pressure) to obtain clean fuel production. Available retrofitting options for refiners include elevation of the hydrogen partial pressure by increasing the recycle gas quality, utilization of more active catalyst compositions, installation of improved reactor components to enhance liquid-solid contact, increasing of reactor volume, and increasing the feedstock quality.

Refractory sulfur compounds, which are considered very difficult to remove in hydrotreating processes conventionally employed for desulfurizing crude oil, include condensed-ring sulfur-bearing heterocyclic dibenzothiophene, shown below:

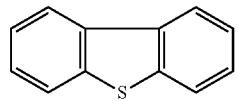

(1)

In addition, certain substituted dibenzothiophenes are particularly difficult to remove. A refractory sulfur compound, which is considered the most difficult to remove in processes employed for desulfurizing crude oil, include condensed-ring sulfur-bearing heterocyclic 4,6-dimethyldibenzothiophene, shown below:

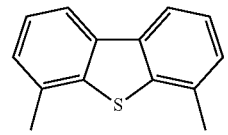

(2)

4,6-dimethyldibenzothiophene can account for a significant percentage of the total organic sulfur in hydrocarbon mixtures such as whole crude oil. This compound can account for as much as 90 ppmw of the total sulfur content of Arabian Light crude oil, as much as 110 ppmw of the total sulfur content of Arabian Medium crude oil, and as much as 108 ppmw of the total sulfur content of Arabian Heavy crude oil. Although these concentrations are relatively low, 4,6-dimethyldibenzothiophene is very difficult to remove during the hydrotreating process at mild hydrotreating conditions, e.g., 30 Kg/cm$^2$ pressure.

Oxidative desulfurization using liquid oxidizing agents in the presence of a catalyst, or combination of catalysts, is known to desulfurize dibenzothiophene and various substituted dibenzothiophenes including 4,6-dimethyldibenzothiophene, as well as other organosulfur compounds including, but not limited to, mercaptans and thiophenes. Organosulfur compounds and, in certain processes, organonitrogen compounds, are oxidized, and oxidation products are subsequently removed from the hydrocarbon product by extraction or other means. Oxidative desulfurization is described, for instance, in U.S. Pat. Nos. 3,278,562, 3,551, 328, 3,719,589, 6,160,193, 6,171,478, 6,274,785, 6,277,271, 6,402,940, 6,406,616, 6,596,914, US Patent Publications US20070151901, US20060131214 US20020035306, US20030094400 and US20040178122; PCT Publications WO2007103440, WO2007106943, WO2006071793, WO2005012458, WO2003014266; and European Patent Publication EP1674158; all of which are incorporated by reference herein.

In Herbstman, et al. U.S. Pat. No. 3,719,589, a process is disclosed in which oil containing sulfur and asphalt is subjected to oxidation with organic peroxides or organic peracids. In this process, the sulfur- and asphalt-containing oil mixture (without solvent) is heated to promote phase separation. Notably, this process does not comprehend the use of solvent as in known solvent deasphalting processes, and temperature conditions generally above the critical temperatures of solvents used in known solvent deasphalting processes must be used to effectuate thermal phase separation.

It is desirable to remove at least some portion of the contaminants, including sulfur and nitrogen, during early processing steps in the refinery. Also, as discussed above, it is often necessary to deasphalt the crude oil during refinery operations in order to fraction the crude oil into useful products and maximize recovery of valuable products. However, conventional pretreatment desulfurization and deasphalting of crude oil generally requires separate and distinct process steps and associated unit operations equipment. For instance, in most refineries, desulfurization is performed on the various fractions following distillation, and heavy distillation products are separately deasphalted.

Accordingly, a need exists for an efficient and effective method for desulfurization and deasphalting of hydrocarbons, such as crude oil or bottoms from various refinery processes. As petroleum companies look to economize in light of increased processing costs, as well as more stringent worldwide regulations regarding sulfur content of transportation fuels, this need becomes more urgent. The elimination or minimization of equipment presently used for desulfurization and deasphalting, or consolidation of the existing equipment, to increase efficiency and lower costs, would be desirable.

Therefore, it is an object of the present invention to provide an integrated desulfurization and deasphalting process that can be practiced without substantial addition to existing facilities of costly equipment, hardware and control systems.

SUMMARY OF THE INVENTION

The above objects and further advantages are provided by the process for integrated deasphalting and desulfurization of hydrocarbon feedstocks. In one embodiment of the invention, a hydrocarbon feedstock, an oxidant, and a catalyst are mixed prior to passage into a primary settler of a solvent deasphalting unit.

In particular, a liquid hydrocarbon feedstock having an asphaltic content and heteroatom molecules including sulfur and nitrogen compounds, is mixed with solvent, oxidant, and oxidation catalyst and the mixture is charged to a solvent deashphalting unit that includes at least one settler. The mixture is maintained in the settler for a residence time sufficient for oxidative reactions between the oxidizing agent and the heteroatom-containing hydrocarbon molecules, and thereafter for phase separation of the mixture into a reduced asphalt content phase and an asphalt phase. Oxidized heteroatom-containing hydrocarbon molecules are in the asphalt phase, due to their polarity. That is, oxidized heteroatom-containing hydrocarbon molecules such as sulfoxides and sulfones have sufficient polarity to cause them to be insoluble in nonpolar solvents used in solvent deasphalting processes. This is in contrast to conventional oxidative desulfurization processes, in which sulfones and sulfoxides are removed with the use of polar solvents, indicating the polarity of these compounds. The asphalt phase containing oxidized heteroatom-containing hydrocarbon molecules is discharged. The reduced asphalt content phase, having a reduced content of heteroatom-containing hydrocarbon molecules, is recovered.

In certain embodiments, the process also includes passing the reduced asphalt content phase to a second settler in which further phase separation occurs. In certain embodiments of the process and system of the present invention, further oxidative desulfurization can occur in the second settler, e.g., if unreacted oxidant passes to the second settler, and the second settler operates at conditions that maintain stability of the oxidant.

Other operations that are conventional to solvent deasphalting processes also occur, including but not limited to solvent recovery from the reduced asphalt content phase and from the asphalt phase.

Advantageously, the present invention integrates unit operations commonly found in existing refineries, and uses them in a manner that achieves desulfurization and deasphalting in a combined, efficacious and efficient manner. Additional processes and operations that are required in prior art systems for desulfurization, including an extraction step that is commonly found with oxidative desulfurization operations, can be avoided, as oxidation by-products including sulfoxides and/or sulfones are removed in the deasphalting zone with the asphalt phase.

BRIEF DESCRIPTION OF THE DRAWINGS

The invention will be described in further detail below and with reference to the attached drawings in which:

FIG. 1 is a schematic diagram of an integrated oxidative desulfurization and deasphalting system and process of the present invention.

DETAILED DESCRIPTION OF THE INVENTION

Referring to FIG. 1, a system and process for combined desulfurization and deasphalting is shown. The integrated system 5 generally comprises apparatus found in a solvent deasphalting unit including a primary settler 10, a secondary settler 20, a deasphalted/demetalized oil separator 30 and associated steam stripper 40, and an asphalt separator 50 and associated steam stripper 60.

A hydrocarbon feedstock stream 11, a solvent stream 71, an oxidant stream 12 and an oxidation catalyst stream 13 are mixed prior to entering the primary settler 10. The feedstock, solvent, oxidant, oxidation catalyst and any recycle streams can be mixed using an in-line mixer or a separate mixing vessel (not shown) upstream of the primary settler 10. The hydrocarbon feedstock can be naturally occurring hydrocarbons including crude oil, bitumens, heavy oils, or shale oils, or hydrocarbon mixtures derived from refinery process units including hydrotreating, hydroprocessing, fluid catalytic cracking, coking, and visbreaking or coal liquification. In general, the hydrocarbon feedstock has a mixture of hydrocarbon compounds with boiling points in the range of about 36° C. to about 1500° C., and preferably in the range of about 520° C. to about 1500° C., and can contain impurities such as one or more of organosulfur compounds and organonitrogen compounds, nickel, vanadium, iron, and molybdenum, which is typical for crude oil compositions.

Although oxidant and catalyst are illustrated as separate feeds 12 and 13 introduced into the hydrocarbon feedstock stream 11, they can optionally be combined as a single feed. Further, the oxidant stream 12 and/or the oxidation catalyst stream 13 can be introduced separately or combined into the solvent stream 71 and/or the bottoms recycle stream 22.

An effective quantity of oxidant and oxidation catalyst is used to complete the desired level of oxidative desulfurization and/or denitrification. For instance, a molar ratio of oxidant, e.g. peroxide to heteroatom compounds present in the feedstock such as sulfur (peroxide:sulfur) can be between about 2:1 to about 50:1 mol/mol, preferably about 2:1 to about 20:1 mol/mol and most preferably about 4:1 to about 10:1 mol/mol. An effective quantity of oxidant can be determined by one of ordinary skill in the art based on, for instance, the concentration of the sulfur, the number of oxygen atoms available for oxidation, the amount of oxidant, if any, that is passed to the primary settler 10 through the bottoms recycle stream 22, and the residence time, i.e., the contact time between the reactants and the oxidant. Catalyst can be introduced in proportions of about 0.0015 weight % to about 20 weight %, preferably about 0.005 weight % to about 10 weight %, and most preferably about 0.005 weight % to about 2 weight %, based on the feedstock mass flow rate. An effective quantity of catalyst can be determined by one of ordinary skill in the art based on, for instance, the available active catalytic sites, the amount of catalyst, if any, that is passed to the primary settler 10 through the bottoms recycle stream 22, and the residence time, i.e., the contact time between the reactants and the catalysts.

Any combination of oxidant and catalyst which accomplishes the conversion of a significant proportion of the organosulfur and organonitrogen compounds in a hydrocarbon mixture while in the environment of the solvent deasphalting unit can be used in the process of the present invention. Oxidants suitable for use in the process for integrated deasphalting and oxidative desulfurization of liquid hydrocarbon feedstocks described herein include organic peroxides, aqueous peroxides such as hydrogen peroxide, or gaseous oxidants. In systems and processes in which aqueous oxidant is used, water separation units can be integrated where necessary to remove excess oxidant, as will be apparent to one of ordinary skill in the art.

Organic peroxides can be organic hydroperoxides such as alkyl hydroperoxides or aryl hydroperoxides, dialkyl peroxides, diaryl peroxides, or a combination comprising at least one of the foregoing organic peroxides. The dialkyl and diaryl peroxides have the general formula $R_1$—O—O—$R_2$, wherein $R_1$ and $R_2$ are the same or different alkyl groups or aryl groups.

The reaction of an organic peroxide with heteroatom-containing hydrocarbon molecules (e.g., sulfur- and nitrogen-containing hydrocarbon molecules) produces oxidized heteroatom-containing hydrocarbon molecules. In addition, consumption of an oxygen atom from the organic peroxide forms organic alcohols, which are soluble in the deasphalted/demetalized oil phase.

The reaction scheme for conversion of 4,6-dimethyldibenzothiophene, by reaction with an organic aryl hydroperoxide, into an oxidized derivative is:

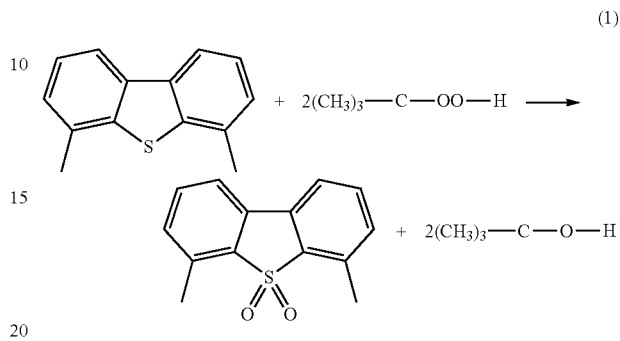

(1)

The reaction scheme for conversion of a typical nitrogen-containing hydrocarbon molecule such as indole (for instance, as recited in Ishihara et al. Applied Catalysis A: General 279 (2005), 279), by reaction with oxygen, into oxidized derivatives is:

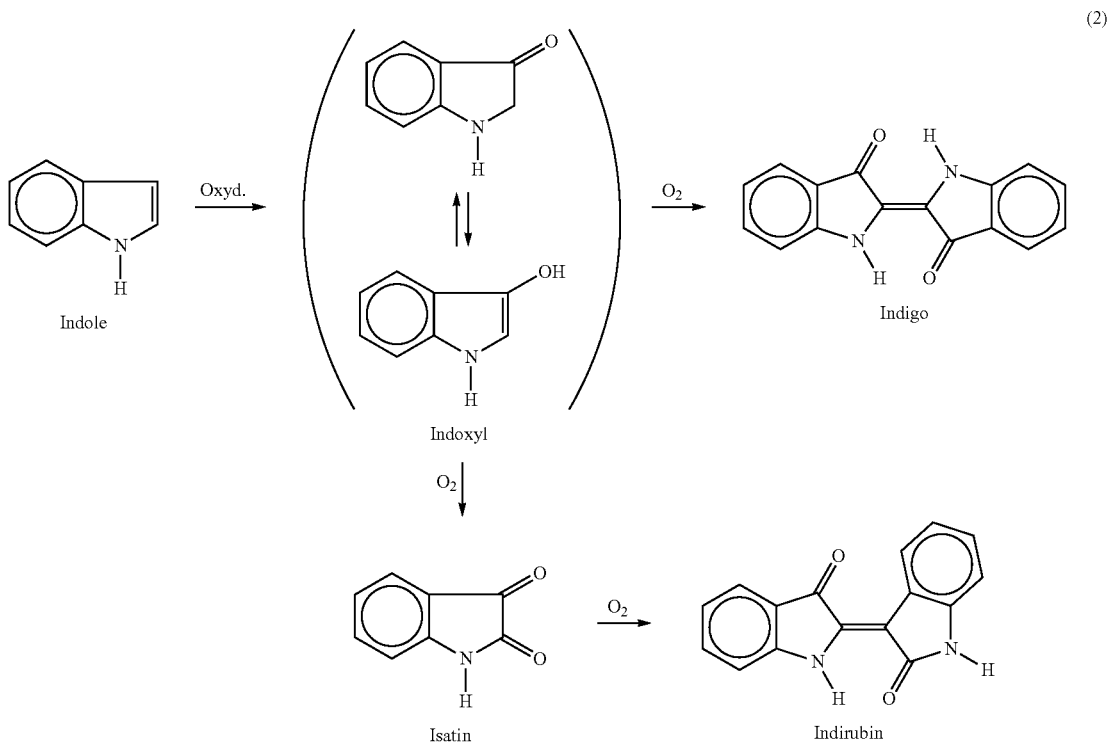

(2)

In a reaction in which a nitrogen-containing hydrocarbon molecule such as indole is oxidized by a peroxide, the product will include corresponding alcohols and ketones.

In addition to providing an oxidizing agent in the form of peroxide compound(s), in certain embodiments, gaseous oxygen can be provided. The oxygen gas can be supplied prior to or during the mixing, using conventional bubbling or sparging techniques. The oxidant can be oxygen, air, oxides of nitrogen, ozone and/or combinations thereof. In systems and processes in which the oxidant is a gaseous oxidant, gas separation units can be used where necessary to remove excess oxidant, as will be apparent to one of ordinary skill in the art.

In certain embodiments, particularly those in which an organic oxidant is selected, oxidation catalysts are chosen that are soluble in the organic oxidant, the hydrocarbon feedstock, or both the organic oxidant and the hydrocarbon feedstock. Suitable homogeneous catalysts having active species selected from the group consisting of Mo (VI), W (VI), V (V), Ti (IV), and combinations comprising at least one of the foregoing active species, possessing high Lewis acidity with weak oxidation potential. One example of a suitable catalyst is molybdenum naphthenate.

In certain embodiments, heterogeneous catalysts or catalysts mixtures can also be used. In addition, the catalysts can be introduced as solids or in oil solution.

The combined stream 14 is passed to primary settler 10 in which both oxidation reactions and phase separation occur. Primary settler 10 serves as the first stage for the oxidation and extraction of deasphalted/demetalized oil from the feedstock. Various devices can be used as, or in conjunction with, primary settler 10 to cause the desired mixing as is known to those having ordinary skill in the art, including counter-current extraction columns provided with fixed internal walls or discs for improving the contact, internal moving walls, or rotating disc contactors. In certain solvent deasphalting systems, solvent and oil are contacted co-currently and a settler is provided downstream. In additional alternative solvent deasphalting systems, a battery of mixers-decanters can be used as the settler. The contents of the primary settler 10 remain in contact under conditions suitable for promoting the oxidation reactions for a period of time that is sufficient to complete the desired degree of desulfurization and phase separation, as determined, for example, by testing of samples recovered via a collection probe using appropriate analytical apparatus (not shown). The residence time can also be predetermined based on experience and the known concentrations of the undesired compounds. In general, the contents can be maintained in contact for a period of about 10 to about 60 minutes, preferably about 15 to about 30 minutes.

During the oxidation reactions, hydrocarbons containing heteroatoms including, but not necessarily limited to, organosulfur and organonitrogen compounds, are oxidized into oxidation products by virtue of their reaction with the oxidizing agents in the presence of the catalysts. The products of the oxidation reactions include converted hydrocarbons compounds such as sulfoxides and/or sulfones as by-products of the organosulfur oxidation reactions. Oxidized heteroatom-containing hydrocarbon molecules are in the asphalt phase, due to their polarity and insolubility in the non-polar solvent. That is, oxidized heteroatom-containing hydrocarbon molecules such as sulfoxides and sulfones have sufficient polarity to cause them to be insoluble in nonpolar solvents used in solvent deasphalting processes. Other components, such as homogeneous catalyst, organic oxidant, and alcohol and ketone by-products can pass with the deasphalted/demetalized oil phase due to their solubility in the non-polar solvent.

The solvents employed include paraffin hydrocarbons containing from 3 through 9 carbon atoms. The ratio (by volume) of feed to solvent in the mixture can be generally in the range of from about 1:2 to about 1:20, and preferably in the range of from about 1:5 to about 1:10. The pressure and temperature conditions at which the mixture remains in primary settler 10 are generally at or below the critical properties of the solvent to prevent oxidant decomposition and maintain the reactants, solvent and oil in the liquid phase. For instance, for a system using n-butane, a suitable temperature range is about 60° C. to about 150° C., preferably about 70° C. to about 90° C., and a suitable pressure range is about 1 bar to about 25 bars, preferably 18 to 23 bars. In a system using n-pentane, a suitable temperature range is about 60° C. to about 180° C., preferably 120° C. to about 145° C., and a suitable pressure range is about 1 bar to about 27 bars, preferably 10 to 25 bars.

Two phases formed in the primary settler are an asphalt phase and a reduced asphalt content phase, e.g., a deasphalted/demetalized oil phase. The temperature at which the contents of the primary settler 10 are maintained is sufficiently low in order to maximize recovery of the deasphalted/demetalized oil from the feedstock. In general, components with a higher degree of solubility in the non-polar solvent will pass with the deasphalted/demetalized oil phase. The deasphalted/demetalized oil phase generally includes a major portion of the solvent, a major portion of the remaining oxidant, a major portion of alcohol and ketone by-products resulting from oxidation using organic peroxides, a minor portion of oxidized heteroatom-containing hydrocarbon compounds, a minor portion of the asphalt content of the feedstock and a major portion of the deasphalted/demetalized oil content of the feedstock. In addition, a major portion of the remaining catalyst can pass with the deasphalted/demetalized oil phase in embodiments in which a homogeneous catalyst is employed, and a minor portion of the remaining catalyst can pass with the deasphalted/demetalized oil phase in embodiments in which a heterogeneous catalyst is employed.

In particular, the deasphalted/demetalized oil phase includes about 50 wt % to about 95 wt % of the total influent solvent, about 90 wt % to about 100 wt % of remaining oxidant (particularly organic oxidant), about 90 wt % to about 100 wt % of alcohol and ketone by-products, about 50 wt % to about 100 wt % of any remaining homogenous catalyst, about 0 wt % to about 10 wt % of any heterogeneous catalyst; about 0 wt % to about 50 wt % of oxidized heteroatom-containing hydrocarbon compounds, up to about 0.05 wt % to about 0.5 wt % of the asphaltic content of the feedstock, and at least about 60 wt % to about 80 wt % of the deasphalted/demetalized oil content of the feedstock.

The type of solvent and the operational temperature in the primary settler 10 influence phase separation, including the characteristics and yield of the deasphalted/demetalized oil. The solubility of the solvent increases with increasing critical temperature, such that C3<iC4<nC4<iC5, i.e., the solubility of iC5 is greater than that of nC4, which is greater than that of iC4, is greater than that of C3. An increase in critical temperature of the solvent increases the deasphalted/demetalized oil yield but with a lesser quality. For example, if a propane solvent is diluted with normal-butane, the mixture of propane and butane will have higher critical temperature than propane and will be able to extract more deasphalted/demetalized oil.

The solvent to oil ratio is also an important factor for selectivity and yields. Higher solvent to oil ratio results in higher yield of deasphalted/demetalized oil. However, the material costs and operational costs (to recycle the solvent) also increase, therefore an optimum solvent ratio is selected. The process is operated at relatively high pressure levels to maintain the solvent in liquid phase, e.g., preferably greater than about 10 bars.

The deasphalted/demetalized oil phase is recovered from primary settler 10 as stream 15 through a collector pipe. The asphalt phase is discharged through the bottom of the primary settler 10 vessel, e.g., through several pipes as is known to one of ordinary skill in the art. In general, components with a lesser degree of solubility in the non-polar solvent precipitate in the non-polar solvent and pass with the asphalt phase. The asphalt phase generally includes a minor portion of the solvent, a minor portion of the oxidant (i.e., unreacted oxidant), a major portion of the oxidized heteroatom-containing hydrocarbon molecules, minor portion of the deasphalted/demetalized oil content of the feedstock, and a major portion of the asphaltic content of the feedstock. In addition, a minor portion of the remaining catalyst can pass with the asphalt phase in embodiments in which a homogeneous catalyst is employed, and a major portion of the remaining catalyst can pass with the asphalt phase in embodiments in which a heterogeneous catalyst is employed.

In particular, the asphalt phase includes about 5 wt % to about 50 wt % of the total influent solvent, up to about 20 wt % to about 40 wt % of the deasphalted/demetalized oil content of the feedstock, about 50 wt % to about 100% wt % of the oxidized heteroatom-containing hydrocarbon molecules, at least about 95 wt % to about 99.5 wt % of the asphaltic content of the feedstock, about 0 wt % to about 10 wt % of alcohol and ketone by-products, about 0 wt % to about 50 wt % of any remaining homogenous catalyst, and about 90 wt % to about 100 wt % of any heterogeneous catalyst.

Deasphalted/demetalized oil phase from primary settler 10 enters secondary settler 20 through two T-type distributors at both ends thereof. An asphalt phase separates and forms at the bottom of secondary settler 20 due to increased temperature, i.e., approaching the critical temperature of the solvent, which contains small amount of solvent and deasphalted/demetalized oil. In certain embodiments, oxidation reactions and extraction continue in the secondary settler 20 if the temperature conditions do not cause decomposition of the oxidant. In further embodiments, additional oxidant and/or catalyst can be added to the secondary settler 20 if the temperature conditions do not cause decomposition of the oxidant. The asphalt phase is recycled back via a stream 22 to primary settler 10 for the recovery of the remaining deasphalted/demetalized oil. The deasphalted/demetalized oil phase is discharged as stream 21 from secondary settler 20 through a vertical collector pipe and is passed to the deasphalted/demetalized oil separator 30. Accordingly, secondary settler 20 serves as the final stage for the extraction.

The deasphalted/demetalized oil separator 30 is dimensioned to permit a rapid and efficient flash separation of solvent. Preferably, at least 90 wt % of the solvent initially introduced into settler 10 is passed to the deasphalted/demetalized oil separator 30. The solvent is flashed from deasphalted/demetalized oil separator 30 and discharged as a stream 31. The bottoms from separator 30 are charged to a stripping vessel 40 for steam stripping of the solvent, e.g., using a 150 psig stream of dry steam. The deasphalted/demetalized oil is collected from the bottom of the stripping vessel 40 as stream 42. The steam and solvent mixture is conveyed via stream 41 to a low pressure solvent tower (not shown).

The asphalt stream 16 is charged to a separator vessel 50 for flash separation of solvent, which is sent via stream 51 to the recycle solvent drum 70 and recycled back to the primary vessel 10. The bottoms are conveyed to an asphalt stripping vessel 60, in which the remaining solvent is stripped, e.g., using a 150 psig stream of dry steam. Asphalt is recovered from the bottom of the stripping vessel 60 as stream 62.

Advantageously, the residual oil mixtures are oxidized while being phase separated in a solvent deasphalting, and the oxidation by-products, which are generally polar and bulky molecules, are separated from the oil mixture. The oxidation and phase separation process can be applied to existing solvent deasphalting units without the need for capital cost investment of additional desulfurization equipment.

With the process integration of the present invention, the existing equipment in use for deasphalting/demetalizing can be used to desulfurize the whole crude oils in a cost effective manner without the requirement for much higher pressure hydrodesulfurization processes.

Accordingly, the present invention achieves the objects of providing an integrated desulfurization and deasphalting system process that can be practiced without the requirement to substantially modify existing facilities by adding costly equipment, hardware and control systems. Furthermore, the hydrocarbon mixture that must be subjected to pre-distillation and distillation processes has a reduced volume and a lesser chemical and physicochemical impact on existing processes, as organosulfur and organonitrogen compounds are converted to hydrocarbons free of heteroatoms, and asphaltenes and organometallic compounds are discharged with the heavy phase in the deasphalting zone.

Unit operations commonly found in existing refineries are advantageously combined and employed in a manner that achieves desulfurization and deasphalting with an increase in efficacy and efficiency.

Furthermore, unlike conventional oxidative desulfurization processes that must use separate unit operations to extract sulfur by-products, the system and method of the present invention uses the deasphalting zone to perform this requisite step.

While not wishing to be bound by theory, it is believed that the advantages of the system and process of the present invention are attained by use of a solvent as used in solvent deasphalting processes according to a colloidal model of petroleum, in which asphaltenes are dispersed by resins molecules, while small molecules such as aromatics act as solvent for an asphaltenes resin dispersion and saturates act as non-solvent. Experiments have shown that if oil is separated into its fractions and subsequently recombined together with a reduced resin, asphaltenes do not go into solution and are present as flocculates. Further, addition of resins brings the asphaltenes back into the solution. However, this is not always true, and in some cases, addition of resins does not bring the asphaltenes back into the solution due to disturbance of the equilibrium. Addition of more saturates disturbs the equilibrium and asphaltenes flocculate. Therefore, addition of paraffinic solvent to the oil mixture as in the process of the present invention disturbs the equilibrium between the oil components and causes the asphalt molecules to flocculate. There will be less resins molecules in the solution to keep the asphaltenes in solution.

Because of the use of paraffinic solvents in solvent deasphalting, the polar sulfones transfer to the asphalt phase. Non-polar solvents such as paraffins are the key in shifting the asphaltenes or polar components such as sulfones to the asphalt phase.

This separation mechanism is in contrast to certain conventional techniques that rely on thermal separation, in which only phase separation occurs. After thermal treatment, the oil composition may be changed due to cracking of some of the components to cause the separation of asphaltenes. The quality and quantity of asphaltenes in both processes will be substantially different. In addition, during thermal separation, sulfones will settle due to their solubility based on the hydrocarbons present in the thermally treated oil.

Example

A crude oil with following properties was selectively oxidized during the solvent deasphalting process.

TABLE 6

| Property/Composition | Unit | Value |
|---|---|---|
| Density at 15° C. | Kg/Lt | 1.0125 |
| Viscosity at 100° C. | cSt | 990 |
| Sulfur | W % | 4 |
| Nitrogen | Ppmw | 3,430 |
| Ni + V | Ppmw | 51 |
| CCR, wt % | W % | 16 |
| C7 Insolubles | W % | 7.5 |
| Saturates | W % | 12.8 |
| Aromatics | W % | 41.3 |
| Resins | W % | 29.3 |
| Asphaltenes | W % | 16.7 |
| Losses | W % | 0.0 |
| Saturates + Aromatics | W % | 54.0 |
| Resins + Asphaltenes | W % | 45.9 |

Vacuum residue is mixed with n-pentane as a deasphalting solvent at a 5:1 solvent:oil. To the same mixture, t-butyl peroxide was added as an oxidant (t-BuOOH/S=10), and sodium tungsten as a catalyst (0.5 wt %). The oxidation reaction was carried out at 75° C. at 1 bar pressure for 2 hours.

The following table summarizes the composition of residual oil feedstock before and after the oxidation reaction.

TABLE 7

| | Before | | After | |
|---|---|---|---|---|
| | W % | S, W % | W % | S, W % |
| Lean Oil (Saturates + Aromatics) | 54.0 | 3.3 | 26.9 | 0.2 |
| Bottoms (Resins + Asphalt) | 45.9 | 4.8 | 73.1 | 8.5 |
| Total | 100.0 | 4.0 | 100.0 | 4.0 |

The lean oil contained 3.3 W % of sulfur. After the oxidation reaction, 50 W % of the oil fraction shifted into the bottoms fractions, yielding 26.9 W % lean deasphalted oil containing 0.2 W % of sulfur. During the reaction, the sulfur compounds are oxidized to sulfones, which are polar in nature and as a result the oxidized sulfur compounds shifts to the bottoms products.

The mixture was then separated for sulfur analysis of the saturates, aromatics, resins, and asphaltenes (SARA analysis). SARA analysis was conducted according to the following method: Asphaltenes were separated by contacting the oil with pentane in excess concentration (300:1 pentane to oil ratio) at room temperature and atmospheric pressure for 24 hours. The saturates fraction was obtained by eluting the maltene fraction over a silica gel column with 17-230 mesh size at an adsorbent to liquid ratio of 1000 using pentane as solvent. The aromatics fraction was eluted using a 50:50 V %:V % mixture of pentane and dichloromethane. The resins fraction was eluted with a mixture of solvents, methanol, acetone and chloroform at 15:15:70 V %:V %:V % ratio.

The method and system of the present invention have been described above and in the attached drawings; however, modifications will be apparent to those of ordinary skill in the art and the scope of protection for the invention is to be defined by the claims that follow.

What is claimed is:

1. A process for deasphalting and reducing the content of heteroatom-containing hydrocarbon molecules in a liquid hydrocarbon feedstock, the liquid hydrocarbon feedstock having an asphaltic content and heteroatom-containing hydrocarbon molecules, the process comprising:
   mixing the liquid hydrocarbon feedstock, solvent, an oxidant, and an oxidation catalyst to provide an intimate mixture;
   introducing the mixture into a settler of a solvent deasphalting unit;
   maintaining the mixture in the settler for a residence time that is sufficient for
      substantial completion of oxidative reaction between the oxidizing agent and the heteroatom-containing hydrocarbon molecules, and
      for phase separation of the reaction mixture into a reduced asphalt content phase and an asphalt phase,
      wherein a substantial portion of oxidized heteroatom-containing hydrocarbon molecules shift to the asphalt phase;
   discharging the asphalt phase containing oxidized heteroatom-containing hydrocarbon molecules; and
   recovering the reduced asphalt content phase having a reduced content of heteroatom-containing hydrocarbon molecules.

2. The process of claim 1, wherein the pressure and temperature of mixture in the settler are predetermined to maintain the asphaltic hydrocarbon feed, the solvent and the reaction products of the oxidant and the heteroatom molecules in a liquid phase.

3. The process of claim 1, wherein the reduced asphalt content phase includes a majority of the original volume of solvent.

4. The process of claim 1, further comprising introducing the reduced asphalt content phase into a second settler vessel, wherein the remaining asphalt phase is separated and discharged, and a further reduced asphalt content phase is recovered.

5. The process of claim 1 which is conducted at temperature and pressure conditions that are at or below the critical properties of the solvent.

6. The process of claim 1, wherein 1 to 50 weight % of the hydrocarbon feedstock is recovered as deasphalted oil for further refining processes including hydrotreating, hydrocracking, fluid catalytic cracking and visbreaking.

7. The process of claim 1, wherein the oxidant is an organic peroxide.

8. The process of claim 7, wherein the organic peroxide is selected from the group consisting of alkyl hydroperoxides, aryl hydroperoxides, dialkyl peroxides, and diaryl peroxides.

9. The process of claim 7, wherein the organic peroxide has the general formula: R1-O—O—R2, wherein R1 and R2 are the same or different alkyl groups or aryl groups.

10. The process of claim 1, wherein the oxidant is selected from the group consisting of one or more of an organic hydroperoxide, an organic peroxide, and a combination of one or more of an organic hydroperoxide and an organic peroxide.

11. The process of claim 1, wherein the catalyst is a transition metal catalyst.

12. The process of claim 11, wherein the transition metal catalyst contains an active species selected from the group consisting of Mo (VI), W (VI), V (V), Ti (IV), and combinations comprising at least one of the foregoing active species.

13. The process of claim 1, wherein the hydrocarbon mixture contains organosulfur compounds and organonitrogen compounds.

14. The process of claim 1, wherein the hydrocarbon mixture contains organosulfur compounds, and the ratio of oxidant to organosulfur compounds present in the initial hydrocarbon mixture is about 2:1 to about 50:1 mol:mol.

15. The process of claim 1, wherein the hydrocarbon mixture contains organosulfur compounds, and the ratio of oxidant to organosulfur compounds present in the initial hydrocarbon mixture is about 4:1 to about 10:1 mol:mol.

16. The process of claim 1, wherein catalyst is introduced in a quantity of about 0.0015 weight % to about 20 weight % based on the mass flow rate of the hydrocarbon mixture.

17. The process of claim 1, wherein catalyst is introduced in a quantity of about 0.005 weight % to about 2 weight % based on the hydrocarbon mixture.

\* \* \* \* \*